(12) United States Patent
Loprieno et al.

(10) Patent No.: US 8,331,788 B2
(45) Date of Patent: Dec. 11, 2012

(54) ENCAPSULATION SCHEME FOR OPTICAL OVER ETHERNET

(75) Inventors: Gilberto Loprieno, Milan (IT); Luca Della Chiesa, Concorezzo (IT); Davide Codella, Como (IT)

(73) Assignee: Cisco Technology, Inc., San Jose, CA (US)

( * ) Notice: Subject to any disclaimer, the term of this patent is extended or adjusted under 35 U.S.C. 154(b) by 439 days.

(21) Appl. No.: 12/642,532

(22) Filed: Dec. 18, 2009

(65) Prior Publication Data
US 2011/0150466 A1    Jun. 23, 2011

(51) Int. Cl.
*H04J 14/08* (2006.01)
(52) U.S. Cl. .......................... 398/98; 370/467
(58) Field of Classification Search ............... 398/98; 370/464–467, 474
See application file for complete search history.

(56) References Cited

U.S. PATENT DOCUMENTS

| | | | | |
|---|---|---|---|---|
| 8,040,899 B2 * | 10/2011 | Shei et al. | .................. | 370/395.5 |
| 2008/0075112 A1 * | 3/2008 | Hu et al. | ...................... | 370/466 |
| 2009/0252038 A1 * | 10/2009 | Cafiero et al. | ................ | 370/235 |
| 2009/0323727 A1 * | 12/2009 | Surek | ............................ | 370/503 |
| 2011/0249972 A1 * | 10/2011 | Nemoto et al. | ................. | 398/66 |

OTHER PUBLICATIONS

Fibre Channel Backbone-5 (FC-BB-5) Rev. 2.00, INCITS xxx-200x T11/Projected 1871-D/Rev. 2.00., (Jun. 4, 2009), 180 page.
Wikipedia, Gigabit Ethernet, (Jul. 25, 2009), 6 pages.
Fibre Channel Over Ethernet, http://en.wikipedia.org/wiki/FCoE, (Oct. 28, 2009), 3 pages.
Wikipedia, Fibre Channel, http://en.wikipedia.org/wiki/Fibre_Channel, (Jul. 27, 2009), 6 pages.
Wikipedia, Fibre Channel Network Protocols, http://en.wikipedia.org/wiki/Fibre_Channel_network_protocols, (Jan. 6, 2009), 5 pages.

* cited by examiner

*Primary Examiner* — Leslie Pascal

(57) ABSTRACT

According to one general aspect, a method may include receiving, from an optical transmitter, an optical signal that includes information. In some embodiments, the method may include encapsulating at least a portion of the received information into an Ethernet packet. In various embodiments, the method may include associating a control word with the Ethernet packet. In such an embodiment, the control word may include a status portion that indicates a status of at least a portion of the network including the networking apparatus, and an ordinal number configured to facilitate the re-construction of the information included by the optical signal. In various embodiments, the method may include transmitting the Ethernet packet to a networking apparatus.

20 Claims, 8 Drawing Sheets

FIG. 5
500

| | Type 512 | Ordered Set 514 | Sequential / Ordinal Number 516 | CRC 518 |
|---|---|---|---|---|

| | | |
|---|---|---|
| M | 510 | |
| S | 508 | |
| C | 506 | } 520 |
| R | 504 | |
| L | 502 | |

FIG. 8
800
802 Receiving an optical signal that includes information
804 Encapsulating at least a portion of the received information into an Ethernet packet
806 Associating a control word with the Ethernet packet
808 Transmitting the Ethernet packet to another networking apparatus

ENCAPSULATION SCHEME FOR OPTICAL OVER ETHERNET

TECHNICAL FIELD

This description relates to communicating information, and also to the converting information between one medium or standard to another.

BACKGROUND

Ethernet is a widely field deployed protocol and often used for a very large variety of applications. Gigabit Ethernet (GbE or 1 GigE) in recent years has become widely deployed and generally allows speeds of up to 1 Gb/sec. It is expected that speed increases will occur as time goes by.

Fibre Channel (FC) is generally a gigabit-speed network technology primarily used for storage networking. Fibre Channel Protocol (FCP) is a transport protocol which predominantly transports Small Computer System Interface (SCSI) commands over Fibre Channel networks. Fibre Channel products are available at 1 Gbit/s, 2 Gbit/s, 4 Gbit/s, 8 Gbit/s, 10 Gbit/s and 20 Gbit/s. The various Fibre Channel standards are generally interoperable and backward compatible. However, the higher speed standards (e.g., 10 Gbit/s, 20 Gbit/s) are less so or not backward compatible with any of the slower speed devices. Frequently, 10 Gb and 20 Gb Fibre Channel standards are primarily deployed as a high-speed "stacking" interconnect to link multiple switches.

BRIEF DESCRIPTION OF THE DRAWINGS

FIG. 5 is a block diagram of an example embodiment of a data structure in accordance with the disclosed subject matter.

FIG. 8 is a flowchart of an example embodiment of a technique in accordance with the disclosed subject matter.

Like reference symbols in the various drawings indicate like elements.

DESCRIPTION OF EXAMPLE EMBODIMENTS

Overview

According to one general aspect, a method may include operating a networking apparatus in a network. The method may include receiving an optical signal that includes information; encapsulating at least a portion of the received information into an Ethernet packet, associating a control word with the Ethernet packet. The control word may include a status portion that indicates a status of at least a portion of a network including the networking apparatus, and an ordinal number configured to facilitate the reconstruction of the information included by the optical signal. In various embodiments, the method may include transmitting the Ethernet packet to another networking apparatus.

According to another general aspect, an apparatus may include a receiver configured to receive an optical signal that includes information; an encapsulation engine configured to encapsulate at least a portion of the received information for inclusion into an Ethernet packet; a control word engine configured to generate a control word that includes: a status portion that indicates a status of at least a portion of the network including the networking apparatus, and an ordinal number configured to facilitate the reconstruction of the information included by the optical signal; a packet generator configured to generate an Ethernet packet that includes the encapsulated information and the control word; and a transmitter configured to transmit the Ethernet packet to a networking apparatus.

According to another general aspect, an apparatus may include means for receiving an optical signal that includes information; means for encapsulating at least a portion of the received information into an Ethernet packet; means for generating a control word, the control word including: a status portion that indicates a status of at least a portion of the network including the networking apparatus, and an ordinal number configured to facilitate the re-construction of the information included by the optical signal, means for associating the control word with the Ethernet packet; and means for transmitting the Ethernet packet to another apparatus.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

Description

Figure 1:
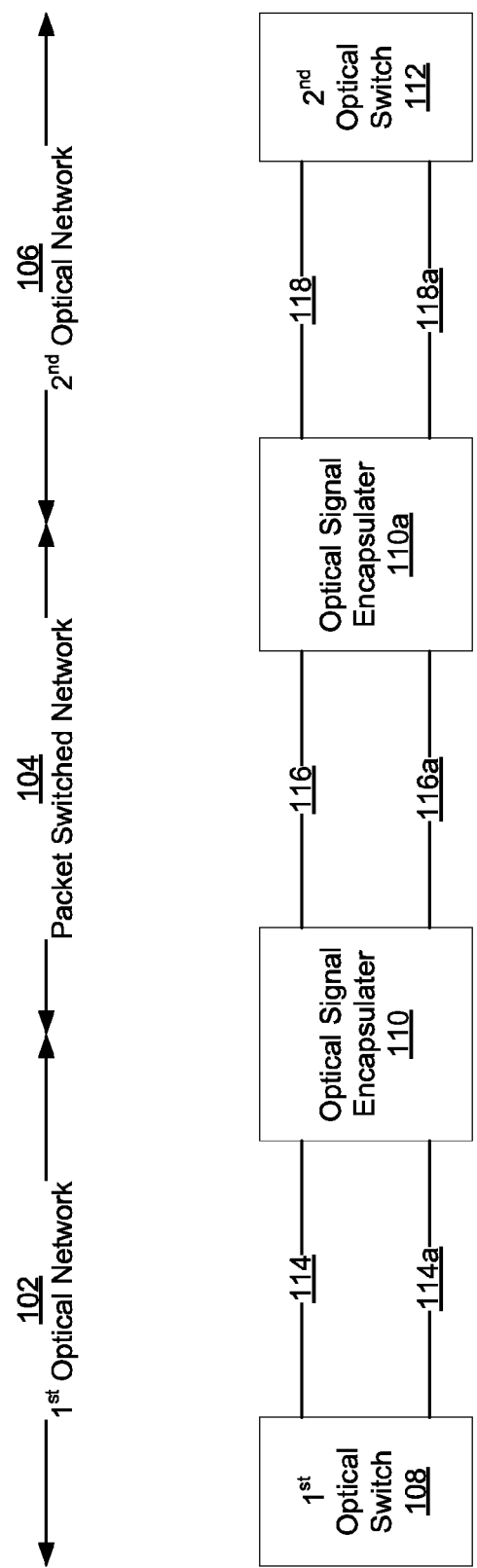
FIG. 1 is a block diagram of an example embodiment of a system in accordance with the disclosed subject matter.

FIG. 1 is a block diagram of an example embodiment of a system 100 in accordance with the disclosed subject matter. FIG. 1 provides a context of the use of the disclosed subject matter within a system (e.g., system 100). The detailed operation of a preferred embodiment apparatus of the disclosed subject matter may be found in reference to FIG. 2.

In various embodiments, the system 100 may include a first optical network 102, a packet switched network 104, and a second optical network 106; although, it is understood that the above is merely one illustrative example to which the disclosed subject matter is not limited. In various embodiments, these three networks 102, 104 and 106 may be employed to communicate information between the optical networks 102 and 106.

According to one example embodiment, an optical signal 114 such as Fibre Channel (FC) data (or data in the form of Fibre channel packets or frames) may be received from optical switch or networking device 108, encapsulated into an Ethernet packet(s) by optical signal encapsulater 110, and transmitted as an Ethernet packet(s) as signal 116. Encapsulation may generally involve providing the information of the received optical signal 114 as a payload of an Ethernet packet(s), and then adding an Ethernet header and trailer to generate the Ethernet packet or packets, as described in greater detail below in reference to FIGS. 2, 3, and 4. Optical signal encapsulater 110*a* may then de-encapsulate (or un-encapsulate) the optical data, e.g., strip off the Ethernet header and trailer to obtain the FC data as the Ethernet packet payload. Optical signal encapsulater 110 may then transmit the optical signal (e.g., FC data) 118 to the second optical switch 112.

In one embodiment, the first optical switch or networking device 108 may transmit data via an optical signal 114. In various embodiments, the optical switch 108 may include a fibre channel switch. In some embodiments, the optical signal 114 may be received via an optical signal encapsulater 110.

In various embodiments, this optical signal encapsulater 110 may be configured to convert or trans-code the received optical signal 114 into the encapsulated signal 116, as described below in reference to FIGS. 2, 3 and 4. In one embodiment, optical signal encapsulater 110 may be configured to perform this action by encapsulating the information included within the optical signal. In various embodiments, this may include encapsulating the information included within the optical signal 114 within an Ethernet packet (e.g., GbE packet, etc.) and hence generate an encapsulated signal 116. Encapsulation may generally involve providing the information of the received optical signal 114 as a payload of an Ethernet packet(s), and then adding an Ethernet header and trailer to generate the Ethernet packet or packets. In various embodiments, this Ethernet packet (or encapsulated signal) may be transmitted via an electrical or optical link.

In various embodiments, this encapsulated signal 116 may be received by another optical signal encapsulater 110a. In some embodiments, the optical signal encapsulater 110a may be configured to un-encapsulate or extract the information included by the encapsulated signal 116 (e.g., remove the information of the optical signal 114 from the payload of the received Ethernet packet(s)) and convert or trans-code the information back to an optical protocol (e.g., FC, etc.) or another optical protocol. This information may then be transmitted via an optical link or optical signal 118 to the second optical switch or networking device 112.

Likewise, the same procedure or technique may be applied for information transmitted from the second optical switch or networking device 112 to the first optical switch 108, via signals 118a, 116a, and 114a. It is understood that while a simplified point-to-point networking system 100 is illustrated, that other embodiment networks may include a plethora of networking topologies, networking protocols, etc., and the disclosed subject matter is not limited to the simplified illustrative embodiment. Furthermore, while fibre channel and Ethernet are two example protocols described herein, it is understood that the above are merely a few illustrative examples to which the disclosed subject matter is not limited.

Figure 2:
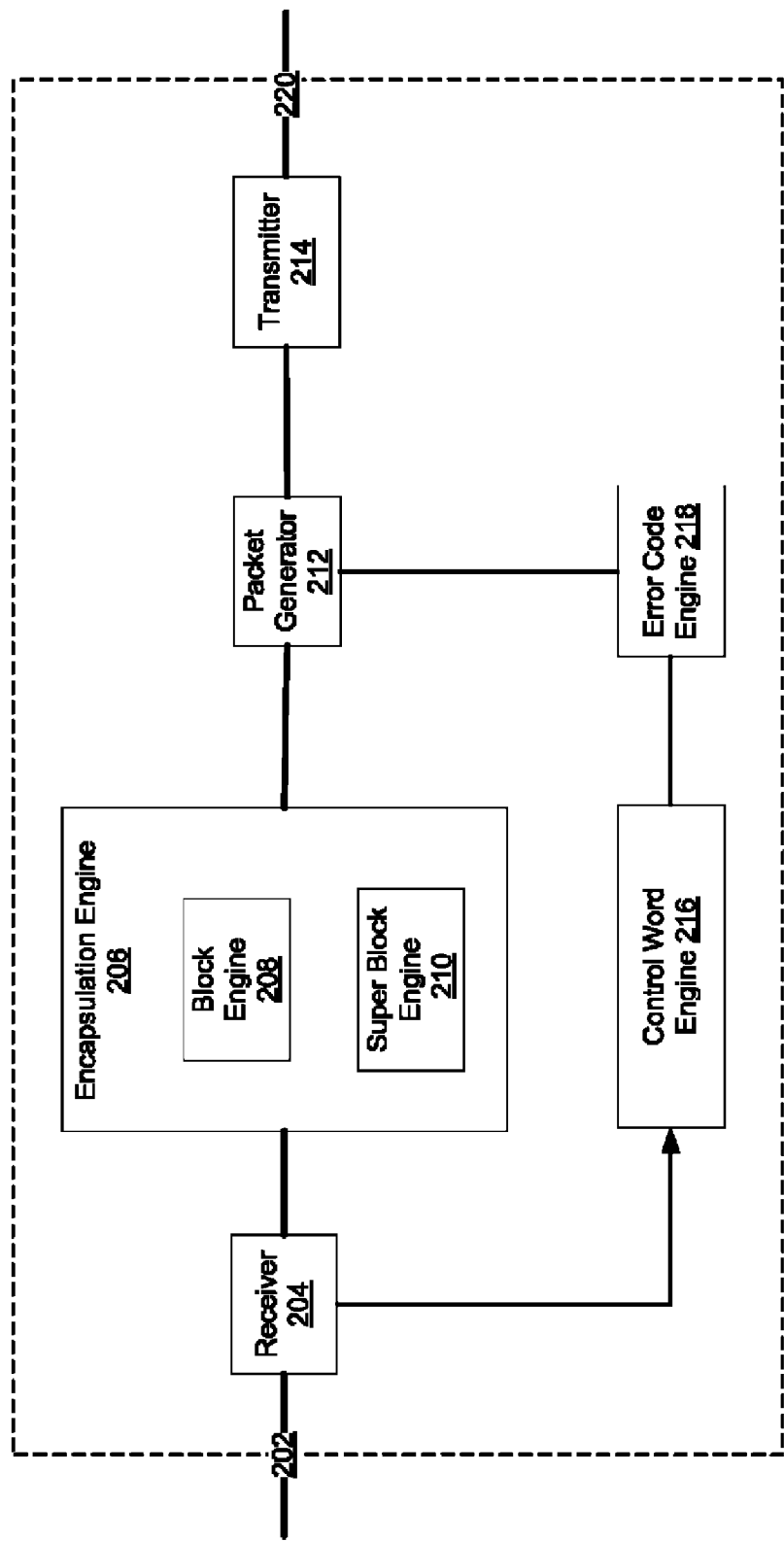
FIG. 2 is a block diagram of an example embodiment of a system or apparatus in accordance with the disclosed subject matter.

FIG. 2 is a block diagram of an example embodiment of a system or apparatus 200 in accordance with the disclosed subject matter. In one embodiment, the apparatus 200 may include an optical signal encapsulater, as described above. In various embodiments, the apparatus 200 may include one or more of the following: a receiver 204, an encapsulation engine 206, a control word engine 216, an error code engine 218, a packet generator 212, and a transmitter 214.

In one embodiment, an input signal 202 may be received by a receiver 204. In one embodiment, the input signal 202 may include an optical signal that includes information (e.g., header information, user data, trailer information, idle frames, etc.). In one embodiment, the input signal 202 may include a signal that includes information arranged in accordance with the fibre channel (FC) protocol, as described above; although, it is understood that the above is merely one illustrative example to which the disclosed subject matter is not limited.

In various embodiments, the encapsulation engine 206 may be configured to encapsulate at least a portion of the information included by the received input signal 202 into another protocol or communication medium. Herein, that protocol in various illustrative embodiments may include the Ethernet protocol and may specifically include the Gigabit Ethernet protocol; although, it is understood that the above are merely a few illustrative examples to which the disclosed subject matter is not limited. One embodiment of the encapsulation scheme performed by encapsulation engine 206 may be illustrated by FIG. 3.

Figure 3:
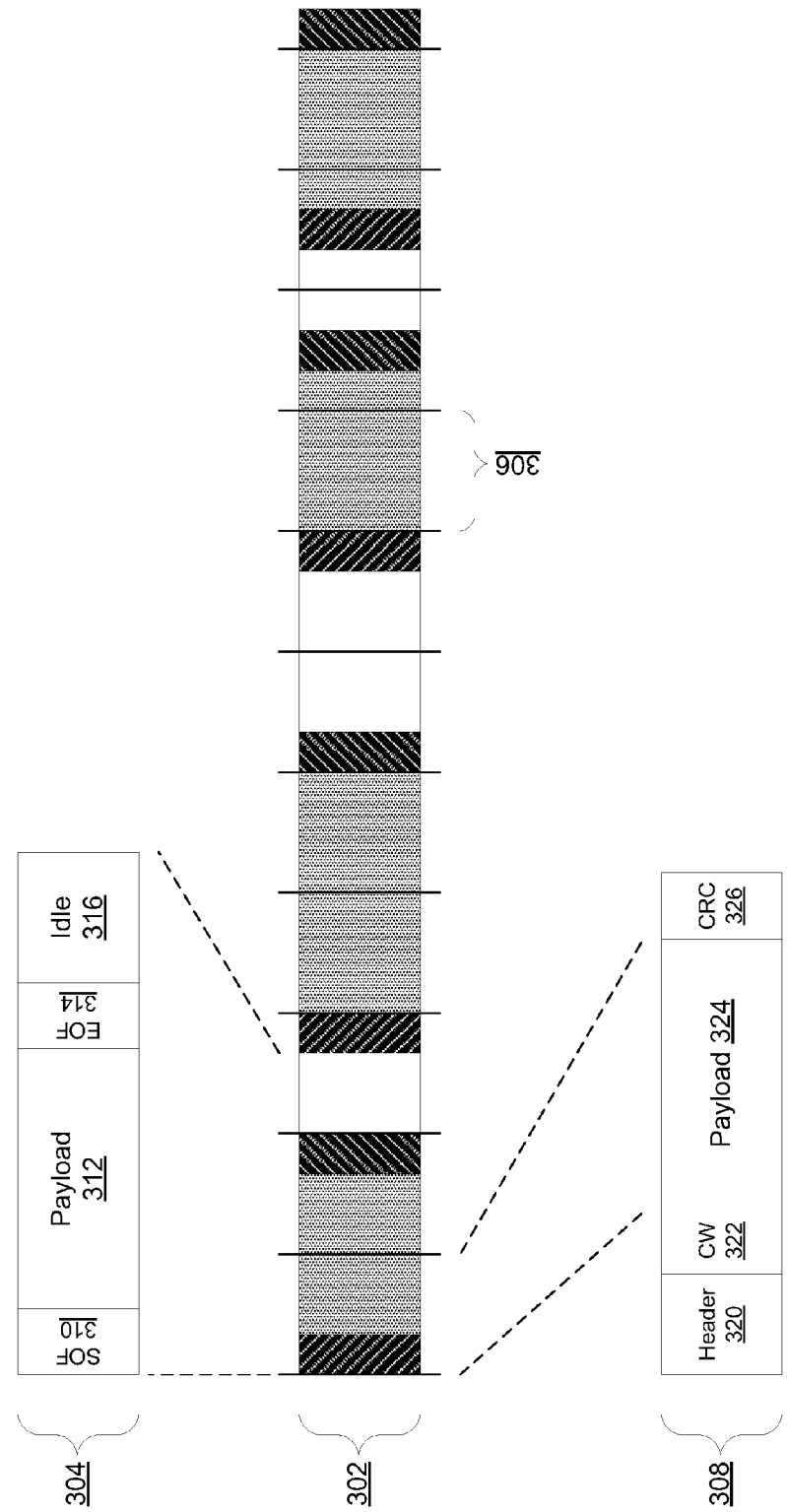
FIG. 3 is a block diagram of an example embodiment of data structures in accordance with the disclosed subject matter.

FIG. 3 is a block diagram of an example embodiment of data structures in accordance with the disclosed subject matter. In one embodiment, the data structure 302 may represent the information included by the input signal that is encapsulated. The data structure 304 illustrates, in one embodiment, a portion of the information shown by data structure 302 (e.g., a Fibre Channel frame and an Idle frame, etc.).

In various embodiments, the data structure 304 may include a start of frame (SOF) identifier 310, a payload portion 312, an end of frame (EOF) identifier 314, and an idle frame or portion 316. In one embodiment, the SOF 310, payload 312, and EOF 314 may include a single frame (e.g., a FC frame, etc.). Although, it is understood that the above are merely a few illustrative examples to which the disclosed subject matter is not limited.

In some embodiments, the data structure 302 may be divided or apportioned into a plurality of segments, or blocks 306 (illustrated by the larger solid lines). In various embodiments, the blocks 306 may be a uniform predefined size (e.g., integer multiples of 8 bytes, 32 bits, 32 bytes, etc.).

In various embodiments, these blocks may be made such that all or a sizable majority of the information of data structure 302 is included within encapsulated blocks. In some embodiments, a portion of the Idle (e.g., Idle 316) frames or portions that do not include user data (e.g., an arbitration (ARB) frame or primitive, etc.) may be removed or added. In some embodiments, this may be done for purposes of clock rate or data rate compensation. In such an embodiment, substantially all of the information received in data structure 302 may be encapsulated and transported via a one or more data structures, such as data structure 308.

In some embodiments, additional bytes may be added to the data structure 302 in order to adapt or match the data structure 302 to a processor configured to convert between an existing protocols. For example, in one embodiment, the data structure 302 may represent a fibre channel structure. In such an embodiment, 48 bytes may be added to the fibre channel structure 306 in order to adapt the structure 306 to a 10 Gigabit Media Independent Interface (XGMII) to 10 Gigabit Attachment Unit Interface (XAUI) processor and ease the matching with a XAUI data structure, typically organized in 8 bytes portions (48 is a multiple of 8); although, it is understood that the above is merely one illustrative example to which the disclosed subject matter is not limited.

Data structure 308 illustrates that, in one embodiment, the encapsulated information may be included within a second or different networking protocol. In the illustrated embodiment, an Ethernet packet 308 is shown; although, it is understood that the above is merely one illustrative example to which the disclosed subject matter is not limited.

In one embodiment, the packet 308 may include a header portion 320, a control word portion 322 (described in more detail below in reference to FIG. 5), a payload portion 324, and trailer portion, illustrated as error correction portion (CRC) 326. In various embodiments, the blocks 306 may be included as part of the payload portion 324.

Returning to FIG. 2, in one embodiment, the encapsulation engine 206 may be configured to encapsulate at least a portion of the information included in the received input signal 202. In one embodiment, the encapsulation engine 206 may be configured to divide or partition the information included by the input signal 202 into blocks or sections, as described in reference to FIGS. 3 and 4. In various embodiments, these blocks may be of a predefined size (e.g., 32 bits, etc.). In such an embodiment, the information may be divided or partitioned by the block engine 208. In various embodiments, each block may include a control flag, or, in some embodiments, an ordered set bit, as described below.

In some embodiments, these blocks or sections may be grouped into one or more super-blocks or larger sections, as described below in reference to FIG. 4. In various embodiments, each super-block may be of a predetermined size. In such an embodiment, the predetermined size of the blocks and/or super-blocks may facilitate the re-construction of the information included by the input signal 202 upon receipt by a receiving networking apparatus. In various embodiments, this action may be performed by the super-block engine 210. FIG. 4 illustrates one embodiment of the encapsulation of information via blocks and super-blocks.

Figure 4:
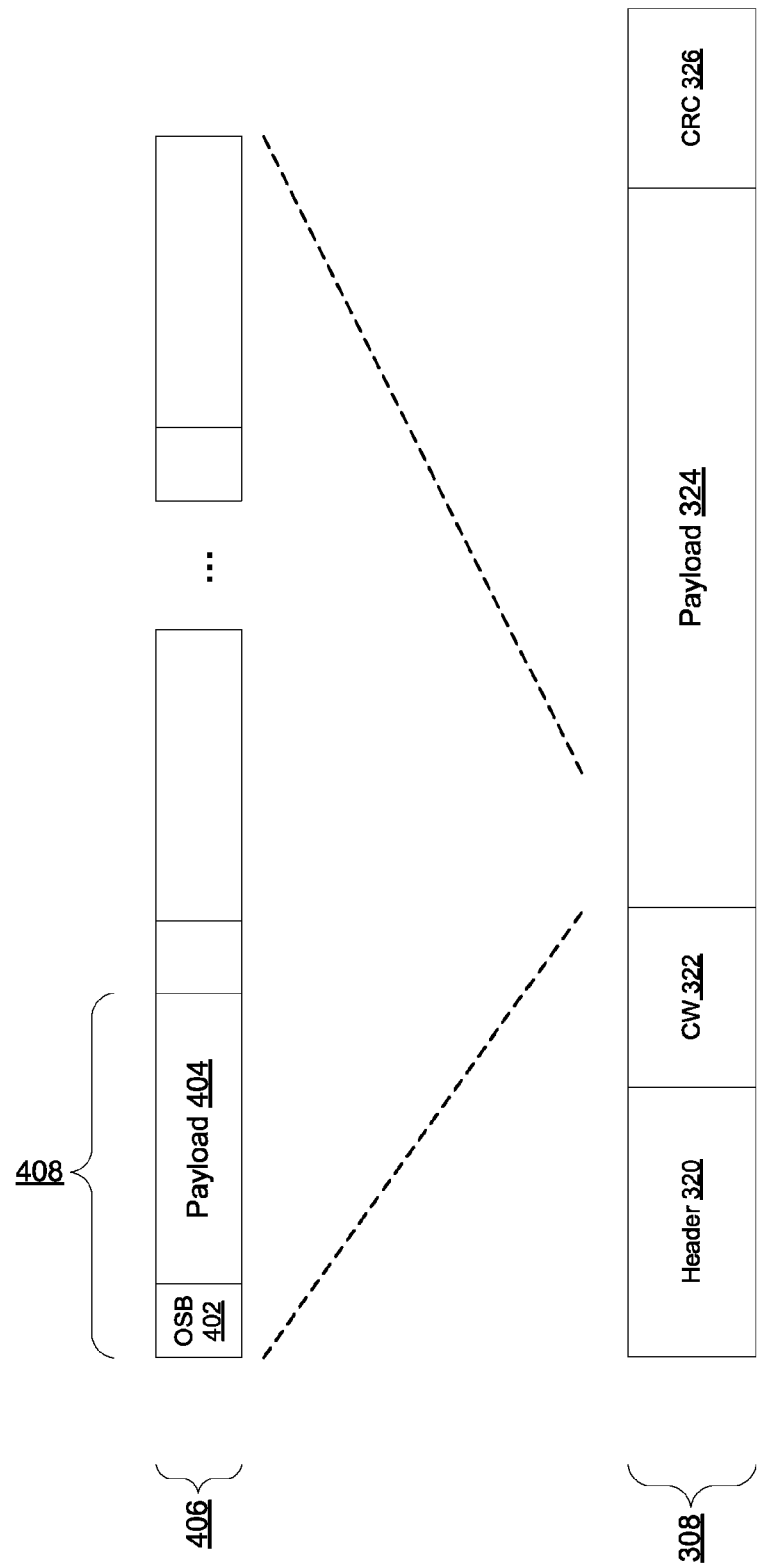
FIG. 4 is a block diagram of an example embodiment of data structures in accordance with the disclosed subject matter.

FIG. 4 is a block diagram of an example embodiment of data structures in accordance with the disclosed subject matter. In one embodiment, the data structure 308 may represent an Ethernet packet; although, it is understood that the above is merely one illustrative example to which the disclosed subject matter is not limited.

In various embodiments, the data structure 308 may include a header portion 320, a control word (CW) portion 322, a payload portion 324 and an error correction (e.g., CRC, etc.) portion 326. In some embodiments, the CW portion 322 may be included as part of the payload portion 324. In various embodiments, the header portion 320 may include a number of various headers or fields (e.g., destination & source address, preamble, VLAN header, etc.). In various embodiments, the error correction portion 326 may generally also include various footer or trailer portions or fields (e.g., end of packet delimiter, frame check sequence (FCS), inter-packet gap (IPG), etc.).

In various embodiments, the payload portion 324 may include a plurality of blocks 408. In some embodiments, these blocks 408 may have been grouped into superblocks 406. In such an embodiment, the payload portion 324 may include one or more superblocks 406, as described above.

In various embodiments, the fibre channel or other protocol information may be word aligned (e.g., to 4 bytes, etc.) and placed or logically grouped into blocks 408. In such an embodiment, each block payload portion 404 may include 32 bits or 4 bytes. In one embodiment, a plurality of these blocks 408 may be grouped into a super-block 406. In such an embodiment, the number of blocks 408 per superblock 406 may be predetermined. For example, in one embodiment, 8 blocks 408 of 32 bits (or 4 bytes) each may be grouped into a superblock 406 then totaling 32 bytes.

In some embodiments, the superblock 406 may include a protocol primitive (e.g., an ordered set word, etc.). In various embodiments, this protocol primitive or ordered set may include a transmission code that includes a combination of control and/or data codes. For example, in one such embodiment, a Fibre Channel ordered set may include an 8-bit (or 10-bit if 8 B/10 B encoded) control code which acts as an instruction or protocol primitive that controls the operation of the network. In various embodiments, such instructions or primitive commands may include arbitration commands, status commands (e.g., Link Reset, etc.), synchronization commands, etc.; it is understood that the above are merely a few illustrative examples to which the disclosed subject matter is not limited. In one embodiment, the order set word may include 1 byte or 8-bits. In various embodiments, this protocol primitive or ordered set word may be subdivided amongst or striped across the blocks 408. In such an embodiment, each block 408 may also include a protocol primitive or ordered set bit (OSB) 402.

In one such embodiment, the protocol primitive or ordered set bit (OSB) 402 may be included within or as part of the block 408, for example bringing the size of block 408 from 32 bits to 33 bits. In such an embodiment, the size of the superblock 406 may subsequently be increased from 32 bytes to 33 bytes; although, it is understood that the above is merely one illustrative example to which the disclosed subject matter is not limited.

Returning to FIG. 2, in various embodiments, the apparatus 200 may include a control word engine 216. In some embodiments, the control word engine 216 may be configured to generate a control word based at least in part upon the information included by the input signal 202, as described below in reference to FIG. 5

In one embodiment, the control word may also include information generated by the apparatus 200. In various embodiments, the control word may include an ordinal number. In various embodiments, this ordinal number may include a sequential number that substantially identifies each block, super-block and/or packet encapsulated or transmitted by the apparatus 200. In such an embodiment, these ordinal numbers may be employed or used by a receiving apparatus (e.g., optical signal encapsulater 110a of FIG. 1, etc.) to re-construct the information included by the input signal 202.

In various embodiments, the control word generated by the control word engine 216 may be received by an error code engine 218. In various embodiments, the control word engine 216 and the error code engine 218 may be integrated into a single unit or component. In some embodiments, the error code engine 218 may be configured to generate an error correction or detection code based upon the control word. In some embodiments, the error correction code may include a cyclic redundancy check (CRC) code; although, it is understood that the above is merely one illustrative example to which the disclosed subject matter is not limited. In such an embodiment, this code may be included as part of the control word, as described below.

FIG. 5 is a block diagram of an example embodiment of a data structure or control word 500 in accordance with the disclosed subject matter. It is understood that the illustrated data structure or control word 500 is merely one illustrative example to which the disclosed subject matter is not limited.

In various embodiments, the control word 500 may include a status portion 520, a type identifier 512, a protocol primitive or ordered set portion 514, a sequential or ordinal number portion 516 and an error correction code or CRC portion 518. In some embodiments, the control word 500 may include only one or more of these portions or other portions.

In one embodiment, the status portion 520 may include a series or plurality of status bits, flags, or a bitmap (e.g., flags 502, 504, etc.). In one embodiment, the status portion 520 may be configured to indicate the status or a subset of the overall status of the network that includes the transmitting and receiving networking apparatuses that, respectively, send and receive the control word 500.

In one embodiment, the status portion 520 may include a Loss (L) bit or flag 502 configured to indicate that the associated packet (e.g., packet 308 of FIG. 3, etc.) includes invalid payload data. In some embodiments, this may be caused by a failure of the attachment circuit or interface between the transmitting networking apparatus and an associated optical switch or networking device.

In some embodiments, the status portion 520 may include a Remote Error or Fail (R) flag or bit 504. In some embodiments, this R flag 504 may be configured to indicate that an error has occurred in which data is no longer being properly received from the receiving device. In various embodiments, such as that of FIG. 7, the transmitting and receiving devices may be arranged in a loop such that the transmitting device may provide feedback to the receiving device, as described below.

In one embodiment, the status portion 520 may include a client signal failure (C) flag or bit 506. In various embodiments, this C flag 506 may be configured to indicate the loss of reception of the client optical signal.

In another embodiment, the status portion 520 may include a client synchronization failure (S) flag or bit 508. In various embodiments, this S flag 508 may be configured to indicate the loss or character or symbol synchronization with the client optical signal.

In yet another embodiment, the status portion 520 may include a main or protected path (M) flag or bit 510. In various embodiments, a one or more redundant network paths may be created such that the likelihood of loss of data due to a network failure is reduced. In such an embodiment, the M flag 510 may indicate where the transmitted control word and accompanying data are being transmitted via the master or preferred networking path, or via a redundant or protected networking path. In various embodiments, with more than two paths, more than 1-bit may be employed as part of or included by the M flag 510.

It is understood that the above are merely a few illustrative examples to which the disclosed subject matter is not limited. It is also understood that none of these flags are limited to single bits, or to a particular ordering. Furthermore, it is also understood that these bits or flags need not be mutually exclusive, in one embodiment.

In one embodiment, the control word 500 may include a type portion 512. In various embodiments, the type portion 512 may be configured to indicate what type of protocol was employed by the optical signal whose information is encapsulated within the packet associated with the control word 500. In one embodiment, the type portion 512 may include a 3-bit field. In various embodiments, example types or protocols may include fibre channel 1 Gb/s (FC-1), fibre channel 2 Gb/s (FC-2), fibre channel 4 Gb/s (FC-4), fibre channel 8 Gb/s (FC-8), fibre channel K1-K2 protocol with different codes distinguishing the first nibble form the other K1-K2 nibbles. Although, it is understood that the above are merely a few illustrative examples to which the disclosed subject matter is not limited.

In various embodiments, the control word 500 may include a protocol primitive or ordered set portion 514. In various embodiments, this ordered set portion 514 may be configured to convey encoded protocol primitives or ordered set (in the case of fibre channel) values. In one embodiment, the ordered set 514 portion may include 4-bits. In various embodiments, these bits may be encoded to represent the following example protocol primitives or ordered sets: Not Operational (NOS), Offline (OLS), Link Reset (LR), Link Resent Response (LRR) Code Violation Running Disparity (CVRD), etc.; although, it is understood that the above are merely a few illustrative examples to which the disclosed subject matter is not limited.

In some embodiments, the control word 500 may include a sequential or ordinal number portion 516. In various embodiments, the sequential or ordinal number portion 516 may be configured to indicate where in a sequence of packets, super-blocks, or portion of information the super-block is associated with the control word 500 is to be placed. For example, in one embodiment, as each piece of the information included within the optical signal is encapsulated, the information may be assigned or associated with a number. Upon receipt of the encapsulated information, the receiver may make use of this ordinal number to reassemble the information.

In one embodiment, the control word 500 may include an error correction or detection portion 518. In various embodiments, the error correction or detection portion 518 may be configured to facilitate the detection and, in some embodiments, the correction of an error (e.g., a transmission error, bit flip, etc.) within the control word 500. In some embodiments, the error correction or detection code portion 518 may include a cyclic redundancy check (CRC) code or another error code.

In one embodiment, the control word 500 may include 32-bits or 4 bytes. In such an embodiment, the status portion 520 may include 5-bits, the type portion 512 may include 3-bits, the protocol primitive or ordered set potion 514 may include 4-bits, the sequential or ordinal number portion 516 may include 16-bits, and the error correction/detection portion 518 may include 4-bits. It is understood that the above are merely a few illustrative examples to which the disclosed subject matter is not limited.

In some embodiments, the apparatus 200 may include a packet generator 212. In various embodiments, the packet generator 212 may be configured to generate a packet, frame or other data element or grouping based upon the protocol employed by the apparatus. For example, in one embodiment, the packet generator 212 may be configured to generate an Ethernet packet. In one such embodiment, the packet generator 212 may be configured to generate a Gigabit Ethernet packet. Although, it is understood that the above are merely a few illustrative examples to which the disclosed subject matter is not limited.

Returning again to FIG. 2, in various embodiments, the packet generator 212 may be configured to place the encapsulated data or information (e.g., a block, a super-block, etc.) generated by the encapsulation engine 206 as part or the whole of a payload portion of the generated packet. In some embodiments, the packet generator 212 may be configured to place the control word (e.g., generated by control word engine 216, etc.) within the header portion of the generated packet. In another embodiment, the packet generator 212 may be configured to place the control word within the payload portion of the generated packet. In yet another embodiment, the control word may be appended to the encapsulated information, added as a footer or a trailer portion, etc. It is understood that the above are merely a few illustrative examples to which the disclosed subject matter is not limited.

In various embodiments, the packet generator 212 may be configured to generate any other header, etc., portions or fields that are required or desirable in the creation of the packet. In one embodiment, some of these fields or portions may include data that is generated or created via the information included in the input signal 202. In another embodiment, some of these fields or portions may include predetermined data, or data generated via a rule set. Examples of the extra or other headers or portions are described below in reference to FIG. 5. It is understood that the above are merely a few illustrative examples to which the disclosed subject matter is not limited.

In some embodiments, the apparatus 200 may include a transmitter 214. In various embodiments, this transmitter 214 may be configured to transmit the output signal 220, which may include the generated packet or other data grouping to another networking apparatus or device (e.g., optical signal encapsulater 110*a*, etc.).

In various embodiments, the apparatus 200 or at least another apparatus illustrated by FIG. 2 may be configured to perform actions which are generally the reverse of those described above. In such an embodiment, the apparatus 200 may receive a packet including encapsulated information, which may be extracted and used to reconstruct the optical signal. For example, in one embodiment, a signal may be received, receiver 204, as the input signal 202 which includes encapsulated information and a control word.

In such an embodiment, the control word portion may be processed by the control word engine 216. In some embodiments, the integrity of the control word may be determined by the error code engine 218. In various embodiments, the control word engine 216 may indicate the status of the network or an apparatus or link included by the network, via the control word. In one embodiment, if the status portion of the control word so indicates, an appropriate signal, based upon the protocol employed, (e.g., a Not Operational (NOS), Link Reset Response (LRR), etc.) may be generated; although, it is understood that the above are merely a few illustrative examples to which the disclosed subject matter is not limited.

In various embodiments, the information or payload portion may be processed by the encapsulation engine 206. In some embodiments, this may include removing or extracting blocks and/or super-blocks from the payload portion of the input signal 202; although, it is understood that the above are merely a few illustrative examples to which the disclosed subject matter is not limited.

In some embodiments, the packet generator 212 may be configured to convert the recovered or extracted information and/or any status messages from the control word and generate a packet, frame, or other data grouping that includes a re-constructed version of the signal originally input into the network apparatus that transmitted the input signal 202. For example, the packet generator 212 of the optical signal encapsulater 110*a* of FIG. 1 may be configured to re-construct or convert the signal 114 of FIG. 1 into the signal 116 of FIG. 1.

In various embodiments, a plurality of packets may be received via the input signal 202. Each packet may include a control word and a portion of the encapsulated information. In such an embodiment, the packet generator 212 may be configured to make use of or employ the ordinal numbers included within the control words of the respective packets to determine the order in which the encapsulated information included by the respective packets is to be ordered or re-constructed into the re-constructed information. This re-constructed signal may be transmitted by the transmitter 214.

It is understood that the above alternate description or embodiment illustrated by FIG. 2 does not limit the first embodiment illustrated by FIG. 2. For example, in one embodiment, the transmitter 214 described in the embodiment in which the information of input signal 202 is encapsulated may transmit an electrical Ethernet signal; although, in another embodiment, an optical Ethernet signal may be transmitted. Alternatively, in the embodiment that includes re-constructing the information encapsulated by the input signal 202 the transmitter 214 may be configured to transmit an optical Fibre Channel signal. Although, it is understood that the above are merely a few illustrative examples to which the disclosed subject matter is not limited.

Figure 6:
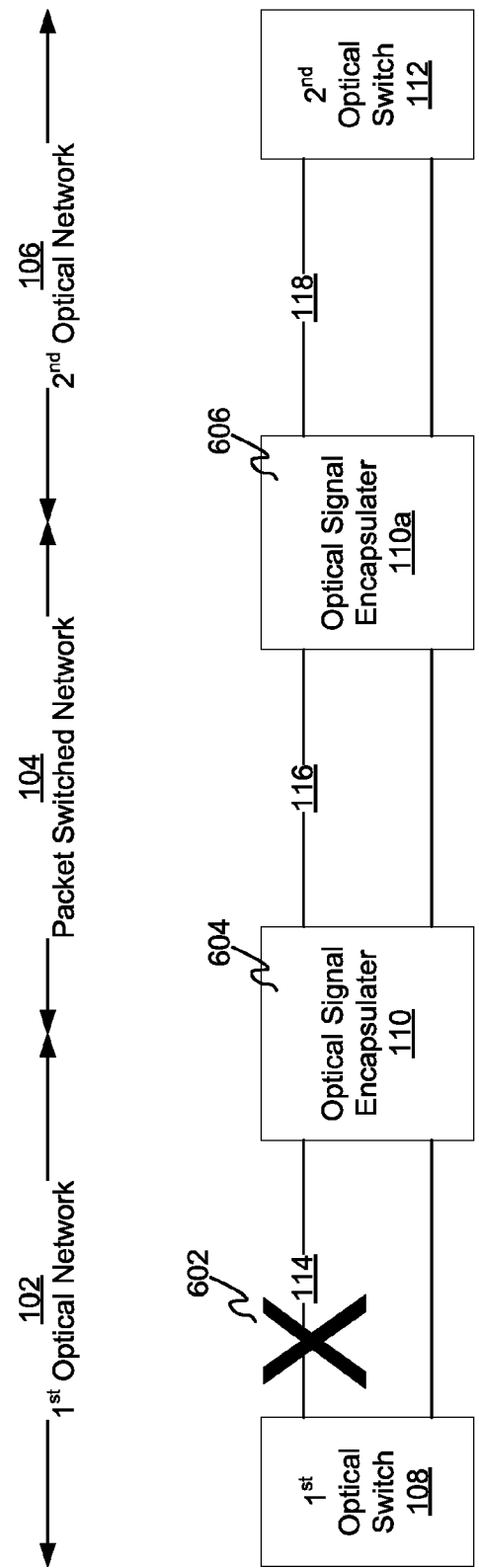
FIG. 6 is a block diagram of an example embodiment of a system in accordance with the disclosed subject matter.

FIG. 6 is a block diagram of an example embodiment of a system 100 in accordance with the disclosed subject matter. In the illustrated embodiment, use of the control word is shown in communicating the status of the network to devices within the network. As described above, the system 100 may include, in one embodiment, a first optical switch 108, a first optical signal encapsulater 110, a second optical signal encapsulater 110*a*, and a second optical switch 112.

In one embodiment, an error 602 may occur between the first optical switch 108 and the first optical signal encapsulater 110, at the link carrying signal 114 marked by the large "X". In various embodiments, the error 602 may include a failure of the incoming fibre channel signal (e.g., a cut cable, loss of synchronization, etc.).

In such an embodiment, the first optical signal encapsulater 110 may detect the error and set an L or Loss flag in the control word to indicate that any encapsulated information is invalid, as represented by event 604. In some embodiments, depending upon the error other status flags or bits may also be set in the control word (e.g., the C flag, or S flag, etc.).

Upon receipt of the encapsulated (but invalid) information, the second optical signal encapsulater 110*a* may detect the set L flag within the control word. In such an embodiment, the second optical signal encapsulater 110*a* may be configured to generate a protocol primate or order set word based at least upon the status flags within the received control word. In one embodiment, the second optical signal encapsulater 110*a* may generate a Not Operational (NOS) ordered set word, as represented by event 606. This may then be transmitted to the second optical switch 112.

Figure 7:
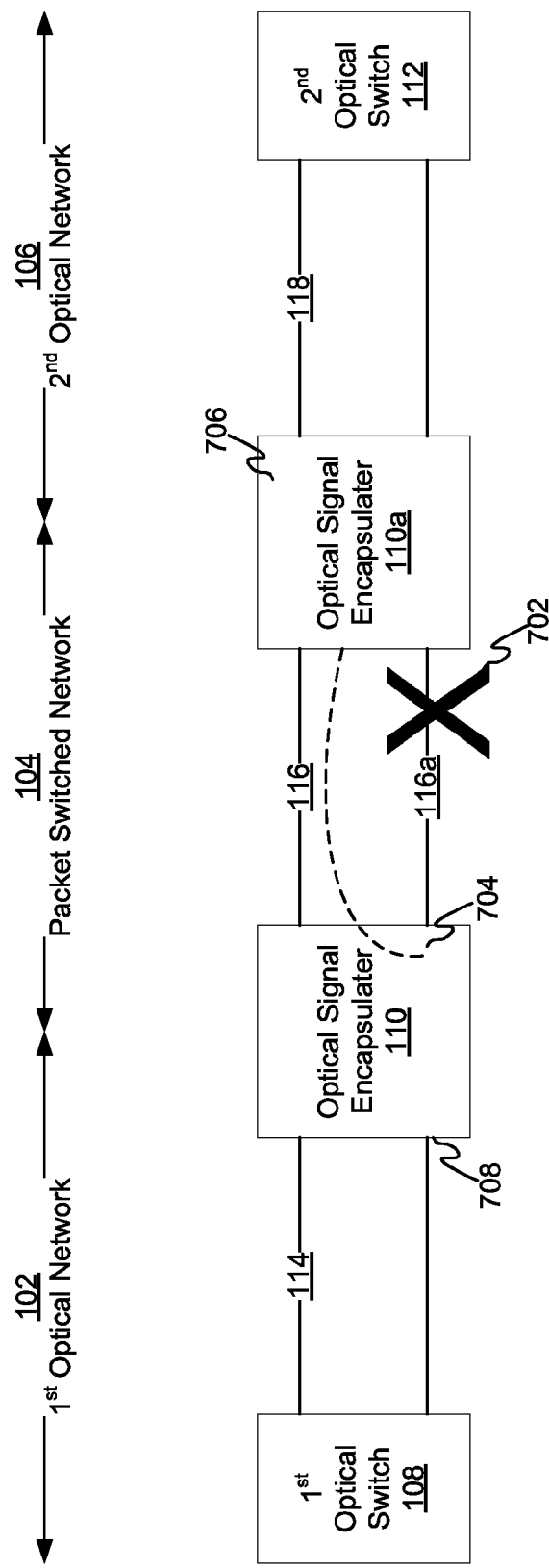
FIG. 7 is a block diagram of an example embodiment of a system in accordance with the disclosed subject matter.

FIG. 7 is a block diagram of an example embodiment of a system 100 in accordance with the disclosed subject matter. In the illustrated embodiment, use of the control word is again shown in communicating the status of the network to devices within the network. As described above, the system 100 may include, in one embodiment, a first optical switch 108, a first optical signal encapsulater 110, a second optical signal encapsulater 110*a*, and a second optical switch 112.

In one embodiment, an error may occur to the return link, which carries signal 116*a* (e.g., a cut cable, etc.), as represented by action 702. In such an embodiment, an expected packet may never arrive and eventually be classified by the first optical signal encapsulater 110 as a "lost packet" or the equivalent, as represented by action 704.

In one such embodiment, the first optical signal encapsulater 110 may generate a protocol primitive or ordered set indicating that the network or at least the links between the second optical switch 112 and the first optical switch 108 are Not Operational (NOS), as represented by action 708. This message may be transmitted to the first optical switch 108.

In various embodiments, the first optical signal encapsulater 110 may also generate a control word that includes an indication that a remote failure has occurred (e.g., a set R flag or bit, etc.). This message or packet (represented by the dashed line) may be sent to the second optical signal encapsulater 110*a*. Upon receipt by the second optical signal encapsulater 110*a*, (represented by action 706) an error handling routine or rule set may be initiated.

It is understood that the above are merely a few illustrative examples to which the disclosed subject matter is not limited. In various other embodiments or periods of operation of the illustrated embodiment, other actions may be performed resulting in different control words and/or packet generation and transmission. Also, these control words and packets may result in various optical network messages, words, protocol primitives etc. being generated and transmitted.

FIG. 8 is a flow chart of an example embodiment of a technique in accordance with the disclosed subject matter. In various embodiments, the technique 800 may be used or produced by the systems such as those of FIGS. 1, 2, 6, and/or 7. Furthermore, portions of technique 800 may use or produce data structures such as those of FIG. 3, 4, or 5. Although, it is understood that the above are merely a few illustrative examples to which the disclosed subject matter is not limited. It is understood that the disclosed subject matter is not limited to the ordering of or number of actions illustrated by technique 800.

Block 802 illustrates that, in one embodiment, an optical signal that includes information may be received, as described above. In one embodiment, this optical signal may have been transmitted from an optical transmitter or networking apparatus, as described above. In some embodiments, the optical signal may include or employ a fibre channel protocol, as described above. In various embodiments, one or more of the action(s) illustrated by this Block may be performed by the apparatuses or systems of FIG. 1, 2, 6, or 7, or the receiver 204 of FIG. 2, as described above.

Block 804 illustrates that, in one embodiment, at least a portion of the received information may be encapsulated into an Ethernet packet, as described above. In one embodiment, encapsulating may include encapsulating a proprietary ordered set word, as described above. In some embodiments, encapsulating may include not interacting with or negotiating with a high level protocol employed by the optical signal, such that substantially all of the information included by the optical signal is encapsulated in a plurality of Ethernet packets, as described above. This may be compared to other encapsulation techniques in which the information is encapsulated based upon the protocol employed by the optical signal (e.g., only the user data is encapsulated, etc.), as described above.

In one embodiment, encapsulation may include dividing the portion of the received information into a plurality of blocks, wherein each block is of a predefined size, as described above. In various embodiments, encapsulation may include grouping a predefined number of blocks into a super-block, as described above. In some embodiments, encapsulation may include including an ordered set word into the super-block, as described above. In various embodiments, encapsulating may include encapsulating the super-block, which includes the number of blocks and ordered set word, into an Ethernet packet, as described above. In various embodiments, one or more of the action(s) illustrated by this Block may be performed by the apparatuses or systems of FIG. 1, 2, 6, or 7, or the encapsulation engine 206, Block engine 208, and/or superblock engine 210 of FIG. 2, as described above.

Block 806 illustrates that, in one embodiment, a control word may be associated with the Ethernet packet, as described above. In various embodiments, the control word may include a status portion that indicates a status of at least a portion of the network including the networking apparatus, and an ordinal number configured to facilitate the re-construction of the information included by the optical signal, as described above. In another embodiment, the control word may include a protocol type portion configured to identify the protocol employed by the received optical signal, and an ordered set portion configured to represent an ordered set word, as described above. In various embodiments, the status portion of the control word may include a plurality of bit flags each configured to indicate a networking state, as described above. In some embodiments, the control word may include an indication of whether or not the Ethernet packet is being transmitted via a protected path, as described above. In various embodiments, one or more of the action(s) illustrated by this Block may be performed by the apparatuses or systems of FIG. 1, 2, 6, or 7, the packet generator 212 or the control word engine 216 of FIG. 2, as described above.

Block 808 illustrates that, in one embodiment, the Ethernet packet may be transmitted to another networking apparatus, as described above. In various embodiments, one or more of the action(s) illustrated by this Block may be performed by the apparatuses or systems of FIG. 1, 2, 6, or 7, or the packet generator 212 or transmitter 214 of FIG. 2, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method of operating a networking apparatus in a network, the method comprising:
   receiving an optical signal that includes information;
   encapsulating at least a portion of the received information into an Ethernet packet;
   associating a control word with the Ethernet packet, wherein the control word includes:
      a status portion that indicates a status of at least a portion of the network including the networking apparatus, and
      an ordinal number configured to facilitate the re-construction of the information included by the optical signal encapsulated across a plurality of Ethernet packets; and
   transmitting the Ethernet packet to another networking apparatus.

2. The method of claim 1, wherein receiving an optical signal includes receiving an optical signal that employs a fibre channel protocol.

3. The method of claim 1, wherein encapsulating includes:
   dividing the portion of the received information into a plurality of blocks, wherein each block is of a predefined size;
   grouping a predefined number of blocks into a super-block;
   including an ordered set word into the super-block; and
   encapsulating the super-block, which includes the number of blocks and ordered set word, into an Ethernet packet.

4. The method of claim 1, wherein encapsulating includes encapsulating a proprietary ordered set word.

5. The method of claim 1, wherein encapsulating includes not interacting with a high level protocol employed by the optical signal, such that substantially all of the information included by the optical signal is encapsulated in a plurality of Ethernet packets.

6. The method of claim 1, wherein the control word further includes:
   a protocol type portion configured to identify the protocol employed by the received optical signal, and
   an ordered set portion configured to represent an ordered set word.

7. The method of claim 1, wherein the status portion of the control word includes a plurality of bit flags each configured to indicate a networking state.

8. The method of claim 1, wherein the control word includes an indication of whether or not the Ethernet packet is being transmitted via a protected path.

9. A networking apparatus comprising:
   a receiver configured to receive an optical signal that includes information;
   an encapsulation engine configured to encapsulate at least a portion of the received information for inclusion into an Ethernet packet;
   a control word engine configured to generate a control word that includes:
      a status portion that indicates a status of at least a portion of a network including the networking apparatus, and
      an ordinal number configured to facilitate the re-construction of the information included by the optical signal encapsulated across a plurality of Ethernet packets,
   a packet generator configured to generate an Ethernet packet that includes the encapsulated information and the control word; and
   a transmitter configured to transmit the Ethernet packet to another networking apparatus.

10. The apparatus of claim 9, wherein the receiver is configured to receive an optical signal includes receiving an optical signal that employs a fibre channel protocol.

11. The apparatus of claim 9, wherein the encapsulation engine is configured to:
    divide the portion of the received information into a plurality of blocks, wherein each block is of a predefined size;
    group a predefined number of blocks into a super-block;
    include an ordered set word into the super-block; and
    encapsulate the super-block, which includes the number of blocks and ordered set word, for inclusion into an Ethernet packet.

12. The apparatus of claim 9, wherein the encapsulation engine is configured to encapsulate a proprietary ordered set word if the proprietary ordered set word is included with the received optical signal.

13. The apparatus of claim 9, wherein the encapsulation engine is configured to encapsulate substantially all of the information included by the optical signal, regardless of the protocol employed by the optical signal.

14. The apparatus of claim 9, wherein the control word further includes:
    a protocol type portion configured to identify the protocol employed by the received optical signal, and
    an ordered set portion configured to represent an ordered set word.

15. The apparatus of claim 9, wherein the status portion of the control word includes a plurality of bit flags each configured to indicate a networking state.

16. The apparatus of claim 9, wherein the control word includes an indication of whether or not the Ethernet packet is being transmitted via a protected path.

17. A networking apparatus comprising:
    means for receiving an optical signal that includes information;
    means for encapsulating at least a portion of the received information into an Ethernet packet;
    means for generating a control word, the control word including:
       a status portion that indicates a status of at least a portion of a network including the networking apparatus, and
       an ordinal number configured to facilitate the re-construction of the information included by the optical signal encapsulated across a plurality of Ethernet packets,
    means for associating the control word with the Ethernet packet; and
    means for transmitting the Ethernet packet to another apparatus.

18. The apparatus of claim 17, wherein the means for receiving comprises means for receiving an optical signal includes receiving an optical signal that employs a fibre channel protocol.

19. The apparatus of claim 17, wherein the means for encapsulating comprises means for:
- dividing the portion of the received information into a plurality of blocks, wherein each block is of a predefined size;
- grouping a predefined number of blocks into a super-block;
- including an ordered set word into the super-block; and
- encapsulating the super-block, which includes the number of blocks and ordered set word, for inclusion into an Ethernet packet.

20. The apparatus of claim 17, wherein the control word further includes:
- a protocol type portion configured to identify the protocol employed by the received optical signal, and
- an ordered set portion configured to represent an ordered set word.

* * * * *